A. S. NICHOLS.
SHAFT COLLAR.
APPLICATION FILED MAR. 25, 1919.
1,409,758. Patented Mar. 14, 1922.
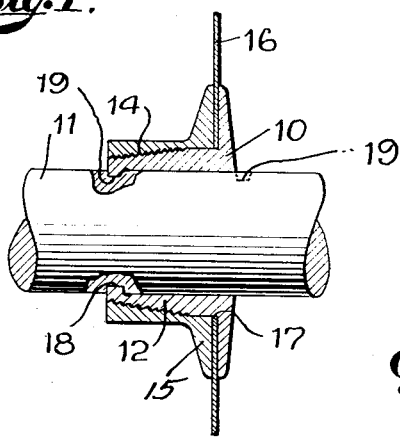
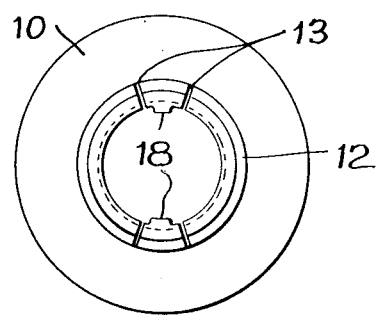
INVENTOR
Aaron S. Nichols.
BY
W. B. Hutchinson.
ATTORNEY

UNITED STATES PATENT OFFICE.

AARON S. NICHOLS, OF NEW YORK, N. Y.

SHAFT COLLAR.

1,409,758.  Specification of Letters Patent.  Patented Mar. 14, 1922.

Application filed March 25, 1919. Serial No. 285,128.

*To all whom it may concern:*

Be it known that I, AARON S. NICHOLS, a citizen of the United States, and a resident of the city, county, and State of New York, have invented a new and useful Improvement in Shaft Collars, of which the following is a full, clear, and exact description.

My invention relates to improvements in collars such as are applied to shafting and used to support other members on the shaft or to connect said members to the shaft. The object of my invention is to provide a cheap, simple and efficient collar which can readily be applied to a shaft, which can be easily and firmly clamped to the shaft, and which is especially adapted to secure rotatable members such as discs, saws, or the like to the shaft. My invention is also intended to provide a collar which can be very conveniently adjusted back and forth on the shaft.

Reference is to be had to the accompanying drawings forming a part of this specification, in which similar reference characters indicate corresponding parts in all the views.

Figure 1 is a broken section of my improved collar as applied to a shaft, and

Figure 2 is an end view of the collar.

The collar 10 can be of any suitable shape, but is provided preferably with one flat flange, and if desired it can be secured at one end to the shaft 11 by a set screw or otherwise, or this part can be left to slide freely on the shaft as desired. It has a prolonged and preferably tapered hub 14 which is slitted longitudinally as shown at 13 in Figure 3 so as to form several segments which will be somewhat springy so that they may be clamped firmly to the shaft. This tapered portion of the hub is screw threaded as shown at 14 so as to receive a correspondingly tapered nut 15, which has a flange to come opposite the flange of the collar 10. As illustrated the collar is designed to carry a disc 16 which may be a saw or the like, and the collar has a shoulder 17 on which the disc fits. Obviously the member 16 may not be a disc or saw but may be any structure which would naturally be carried by a collar.

As an additional means of fastening the collar securely to the shaft, the shaft has disposed at certain points around it holes 19 which are shallow so as not to weaken the shaft, and which are adapted to receive buttons or bosses 18 which are placed on some of the segments 12 of the hub, and thus the hub can be prevented from slipping.

In using the collar, the member 16 is slipped on over the hub 14 and upon the shoulder 17 so as to fit against the flange of the collar 10, after which the nut 15 is screwed on, and this firmly clamps the member 16 between the inner end of the nut and the body portion of the collar, while at the same time it squeezes the segments 12 firmly against the shaft, and thus holds the collar from slipping. This result is further obtained by reason of the buttons 18 which are forced firmly into the holes 19.

I claim:—

The combination with the shaft having holes at different points therein, of a collar having a flat face at an angle to the shaft, a plain surface essentially parallel with the shaft, a tapered split hub having bosses near the free ends to engage the holes in the shaft, and a nut member adapted to fit the thread of the hub and having its inner end adapted to serve as a part of the collar.

AARON S. NICHOLS

Witnesses:
MARTHA EICHENWALD,
E. H. DETTLING.